(12) United States Patent
Knight

(10) Patent No.: US 6,694,664 B1
(45) Date of Patent: Feb. 24, 2004

(54) FISHING LURE RETRIEVER

(76) Inventor: Keith D. Knight, 1338 Day Gap Rd., Cullman, AL (US) 35057

( * ) Notice: Subject to any disclaimer, the term of this patent is extended or adjusted under 35 U.S.C. 154(b) by 0 days.

(21) Appl. No.: 10/336,440

(22) Filed: Jan. 3, 2003

(51) Int. Cl.[7] .............................................. A01K 97/24
(52) U.S. Cl. ............................................................ 43/17.2
(58) Field of Search ................. 43/17.2, 53.5; 294/19.1, 19.2, 66.2, 66.1

(56) References Cited

U.S. PATENT DOCUMENTS

| | | | |
|---|---|---|---|
| 881,163 A | * 3/1908 | Spiess .......................... 294/19.1 |
| 1,504,287 A | * 8/1924 | Thurston .................... 294/19.1 |
| 2,083,814 A | 6/1937 | Bence |
| 2,316,500 A | * 4/1943 | Bray ............................ 43/17.2 |
| 2,344,838 A | 3/1944 | Van Sickle |
| 2,443,061 A | * 6/1948 | Waltamath .................. 43/17.2 |
| 2,749,653 A | * 6/1956 | Patrowsky et al. ........... 43/53.5 |
| 2,758,406 A | 8/1956 | Childress |
| 2,768,462 A | * 10/1956 | Younce, Sr. .................. 43/17.2 |
| 2,770,062 A | 11/1956 | Russell |
| 2,793,463 A | * 5/1957 | Nieman ........................ 43/53.5 |
| 2,800,738 A | * 7/1957 | Allman ........................ 43/17.2 |
| 2,861,383 A | * 11/1958 | Gray ............................ 43/53.5 |
| 2,906,050 A | * 9/1959 | Foster et al. .................. 43/17.2 |
| 2,940,203 A | * 6/1960 | Carter .......................... 43/17.2 |
| 2,950,558 A | * 8/1960 | Karpes ........................ 43/17.2 |
| 3,156,064 A | * 11/1964 | Czirr ............................ 43/17.2 |
| D199,737 S | 12/1964 | Cross |
| 3,295,243 A | * 1/1967 | Mohar, Sr. .................... 43/17.2 |
| 3,336,067 A | * 8/1967 | Cloyd .......................... 43/17.2 |
| 3,374,570 A | 3/1968 | Lenzen |
| 3,603,021 A | 9/1971 | Nunley |
| 3,805,435 A | 4/1974 | Serrill |
| 3,889,946 A | * 6/1975 | Setecka ...................... 294/19.2 |
| 4,046,413 A | * 9/1977 | Jeninga ...................... 294/19.2 |
| 4,086,718 A | 5/1978 | Swanson et al. |
| 4,155,190 A | * 5/1979 | McInturff et al. ............ 43/17.2 |
| 4,171,587 A | * 10/1979 | Bullen, Jr. .................... 43/17.2 |
| 4,238,061 A | * 12/1980 | Marchetti et al. .......... 294/19.1 |
| 4,475,836 A | * 10/1984 | Colognori .................. 294/19.1 |
| 4,508,467 A | 4/1985 | Choffin |
| 4,536,984 A | * 8/1985 | Kowal .......................... 43/17.2 |
| 4,619,065 A | * 10/1986 | Jones .......................... 43/17.2 |
| 4,712,324 A | * 12/1987 | Padgett ........................ 43/17.2 |
| 4,914,853 A | 4/1990 | Swindle |
| 5,303,967 A | * 4/1994 | Dubow ...................... 294/19.2 |
| 5,724,762 A | * 3/1998 | Thompson .................. 43/17.2 |
| 5,820,181 A | * 10/1998 | Le Noach .................. 294/19.1 |
| 6,026,607 A | * 2/2000 | Bukowski .................... 43/53.5 |
| 6,092,326 A | * 7/2000 | Strome ........................ 43/17.2 |
| 6,305,119 B1 | * 10/2001 | Kacak .......................... 43/17.2 |

* cited by examiner

*Primary Examiner*—Darren W. Ark
(74) *Attorney, Agent, or Firm*—Joseph H. Beumer

(57) ABSTRACT

A device for retrieving snagged lures has a rigid loop of stiff rod or wire mounted on a pole. The loop is made up of several portions placed in the same plane with one another and connected to a support portion mounted in the pole. The loop has first and second portions that define an acute angle between them at a corner for reaching over and grasping a lure for pulling it upward. A crossover portion completing the loop extends over the first portion and provides a tip for engaging a line and guiding it through a gap and into the loop. Also disclosed is a weighted device which is not connected to a pole, but which includes a similar loop.

8 Claims, 4 Drawing Sheets

FISHING LURE RETRIEVER

FIELD OF THE INVENTION

This invention relates to devices for retrieving fishing lures that have become snagged on underwater obstructions and, more particularly, to pole-type retrievers that may be used to dislodge lures by exerting a force on the lure.

BACKGROUND OF THE INVENTION

One of the problems often encountered in fishing is snagging of hooks and lures in inaccessible locations such as on underwater logs, branches or stumps or on tree limbs adjacent the water's edge. Various devices to assist in retrieval of snagged lures have been developed, and many of these devices are described in patents.

The devices of the prior patents show various disadvantages, including a tendency of the fishing line to become entangled in multi-turn coils, a lack of simplicity and reliability of engaging the line with the device for guiding to the lure, and no capability for use of a pulling force applied to the lure, as well as a pushing force

SUMMARY OF THE INVENTION

This invention is directed to a device for retrieving snagged fishing lures which comprises a rigid loop made up of a stiff rod or wire, the loop being integrally formed with a supporting portion of the rod mounted axially at the end of a pole. The loop is made up of a plurality of sequential portions generally coplanar with one another in a plane disposed at an obtuse angle with respect to the axis of the pole.

The loop has a first portion connected to a second portion so as to provide a corner defining an acute angle between these portions. The second portion is in turn joined to a third portion parallel to the first portion, the third portion being joined to a fourth portion perpendicular to and passing over the first portion, with a gap being defined at the crossover point and a tip extended past the gap.

The acute angle at the stated corner enables the loop, after being passed over a snagged lure, to engage the lure for being pulled upward, even if the lure is small. Thus, in addition to guiding the loop down the fishing line to provide for attempting to loosen the lure by a pushing force from above, the acute angle of the loop provides for securing the lure for application of an upward pulling force. The crossover portion extends generally perpendicular to the first portion and is placed slightly above the first portion to provide a gap through which the fishing line may move when being directed into the loop. The outer end of the crossover portion extends well past the crossover point so that the extended tip may readily engage a fishing line when the pole is rotated as an initial maneuver to place the device in proper position for controlled movement of the loop downward to a snagged lure.

An upward extension of the rod is formed at the inner end of the first portion of the loop, this extension of the rod being placed axially with respect to the pole and being securely mounted within the end of the pole. An elongated one-piece pole may be used, but it is preferred that the pole be made up of plural sections which may be telescoped or removably secured together to present a small size for storage or for carrying in a boat without interfering with other objects such as rods, reels or paddles.

To facilitate handling and manipulation of the retriever, it is preferred that the plane in which the loop is located be slanted downward at an obtuse angle with respect to the axis of the pole.

Lure retrievers embodying the invention may be readily deployed on a fishing line and moved downward to engage a snagged lure by means of a simple procedure. Use of a single loop disposed in a plane away from the axis of the pole to which it is connected lessens the tendency to tangling of the line which may occur where coils with multiple loops are employed. The acute angle located at a corner of the loop allows the loop to securely engage a lure after being passed over the lure through the wider, open area at the center of the loop.

It is, therefore, an object of the invention to provide a lure retriever in which a lure-engaging rigid loop provides a capability for grasping a snagged lure from below as well as for making contact with the lure from above.

Another object is to provide a fishing lure retriever having a lure-engaging rod attached to a telescoping pole.

Yet another object is to provide a lure retriever having a single, uncoiled loop which may be easily coupled to a fishing line by a simple maneuver of the pole carrying the loop.

Other objects and advantages of the invention will be apparent from the following detailed description and the appended claims.

DESCRIPTION OF THE PREFERRED EMBODIMENT

Figure 1:
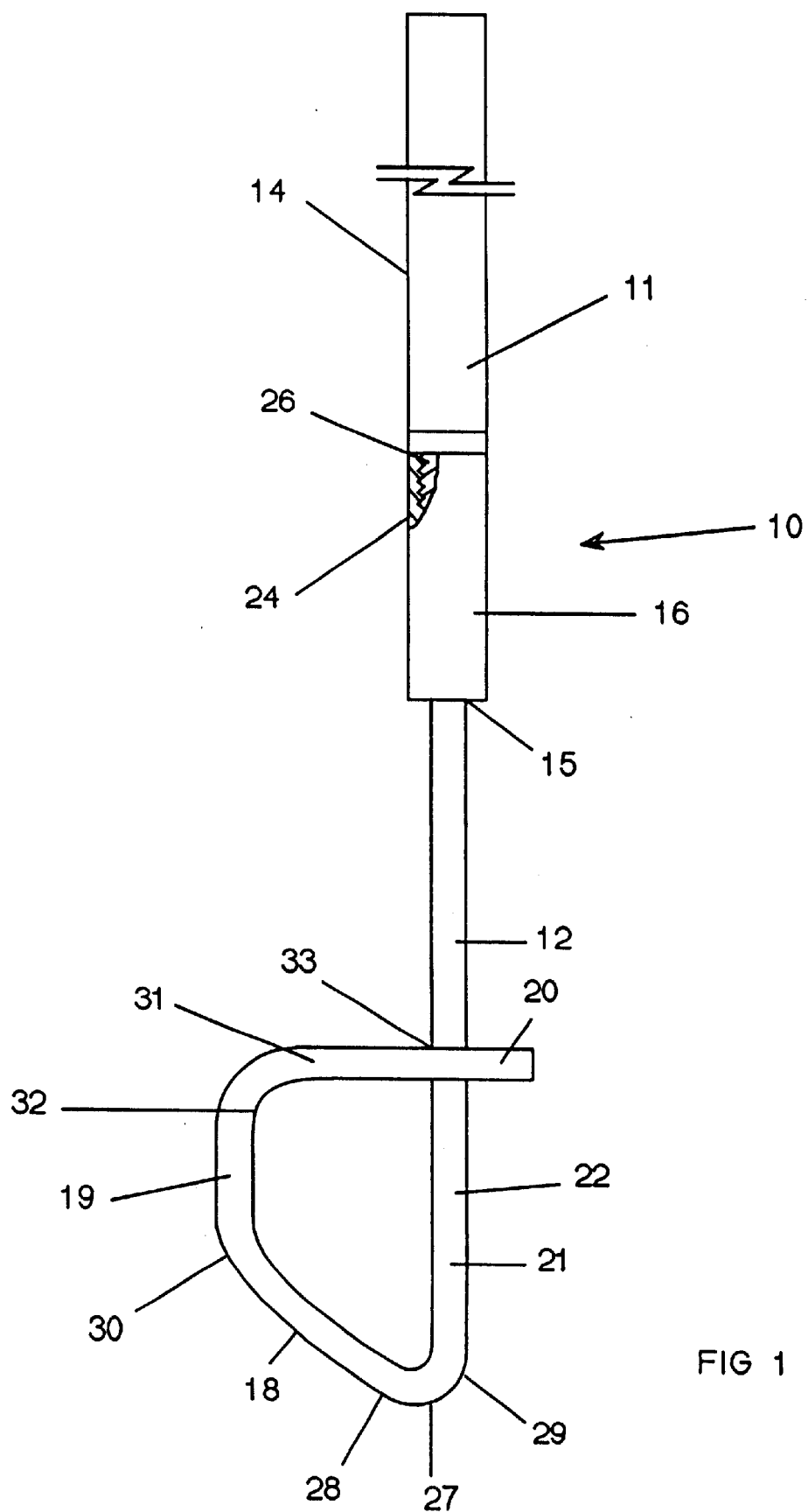
FIG. 1 is a front elevational view of the lure-engaging loop of a lure retriever and the lower end portion of a pole in which the loop is mounted.

Referring to FIG. 1 of the drawings, a lure retriever device 10 is shown. The device has an elongated pole 11 made up of portions 14, 16 removably joined together by engagement of threaded male threads 26 on portion 14 and female threads 24 on portion 16. The pole may also be made up of telescoping portions movable within one another and held in place when deployed by a snap button (not shown).

A rigid loop 22 and supporting portion 12 of the rod or wire are located below end 15 of the pole. Supporting portion 12 is embedded in the pole and may be secured therein by means of an adhesive or by screws or the like. This portion preferably extends downward along the axis of the pole for a distance such as four inches.

Figure 3:
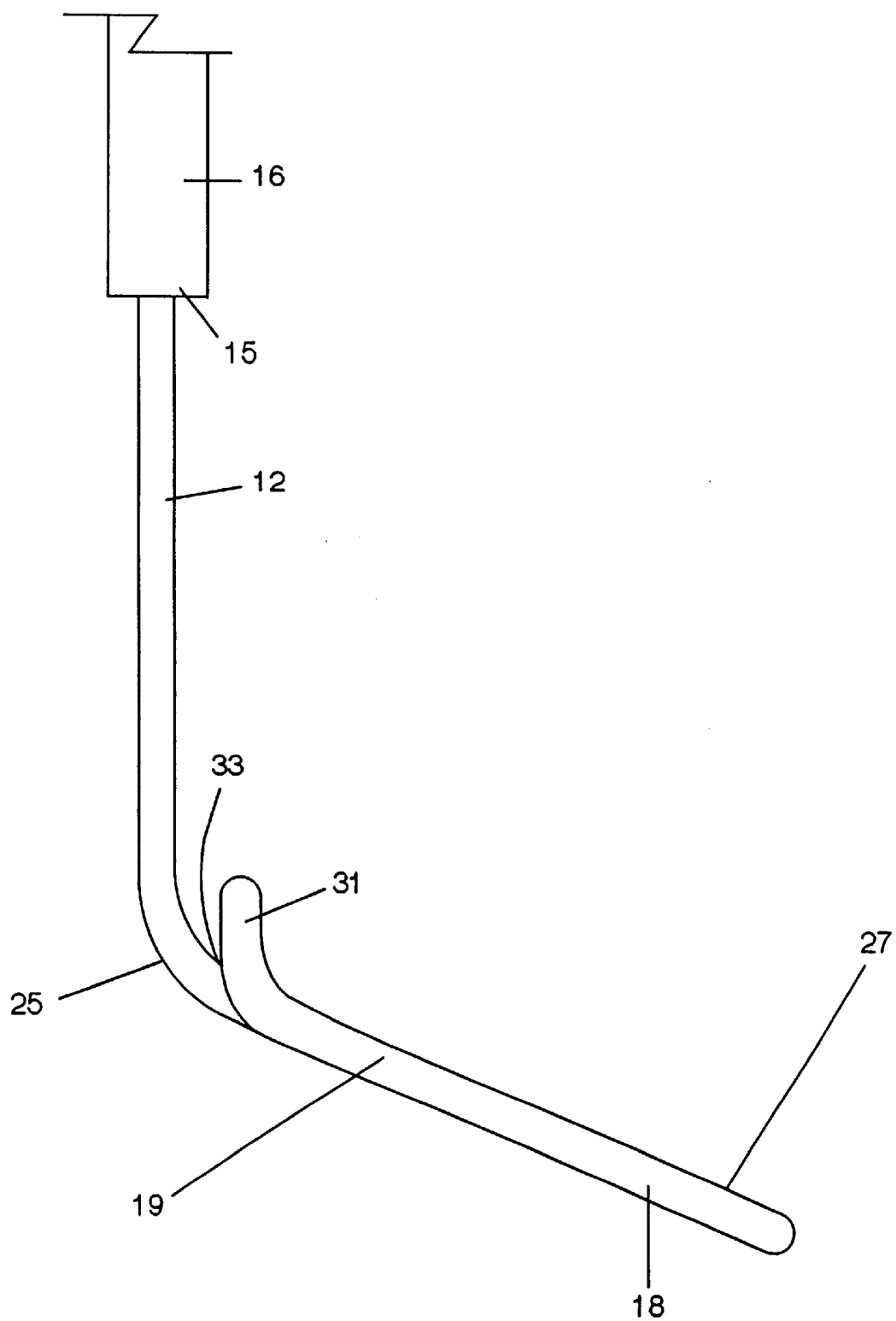
FIG. 3 is a side view of the retriever loop and portion connecting it to a pole.

The loop 22 has four integral parts which are generally located in a common plane disposed to provide an obtuse angle such as 110 to 130 degrees from the axis of the pole and supporting portion 12. First portion 21 extends from bend 25 (FIG. 3) in a straight line for a distance such as 3 and ½ to 4 inches to bend 27, providing a first end of second portion 18 of the loop. The bend 27 is somewhat rounded at segments 28, 29 adjacent the corner for a distance such as ½ inch on each side. Aside from the rounded corner, the overall angle between portions 21 and 18 is acute, preferably about 55 to 70 degrees. This structure provides for more effective grasping of a various size lures when the loop is passed over the lure. The second portion preferably extends for a distance such as 2 to 3 inches.

Third portion 19 of the loop extends from bend 30 along a line parallel to the first portion 21 for a distance such as ½ to 1 inch Fourth portion 31 extends from right angle bend 32 past the first portion 21 a distance such as ½ to 1 inch, providing a tip 20 that enables engagement with a fishing lure. A gap 33 between the first and fourth portions at the point of crossover allows the loop to receive the line. The gap may be from ⅛ to ¼ inch across.

The rod or wire of the loop may be made of a metallic material such as aluminum, brass or steel and may have a diameter of ⅛ to ¼ inch.

Figure 4:
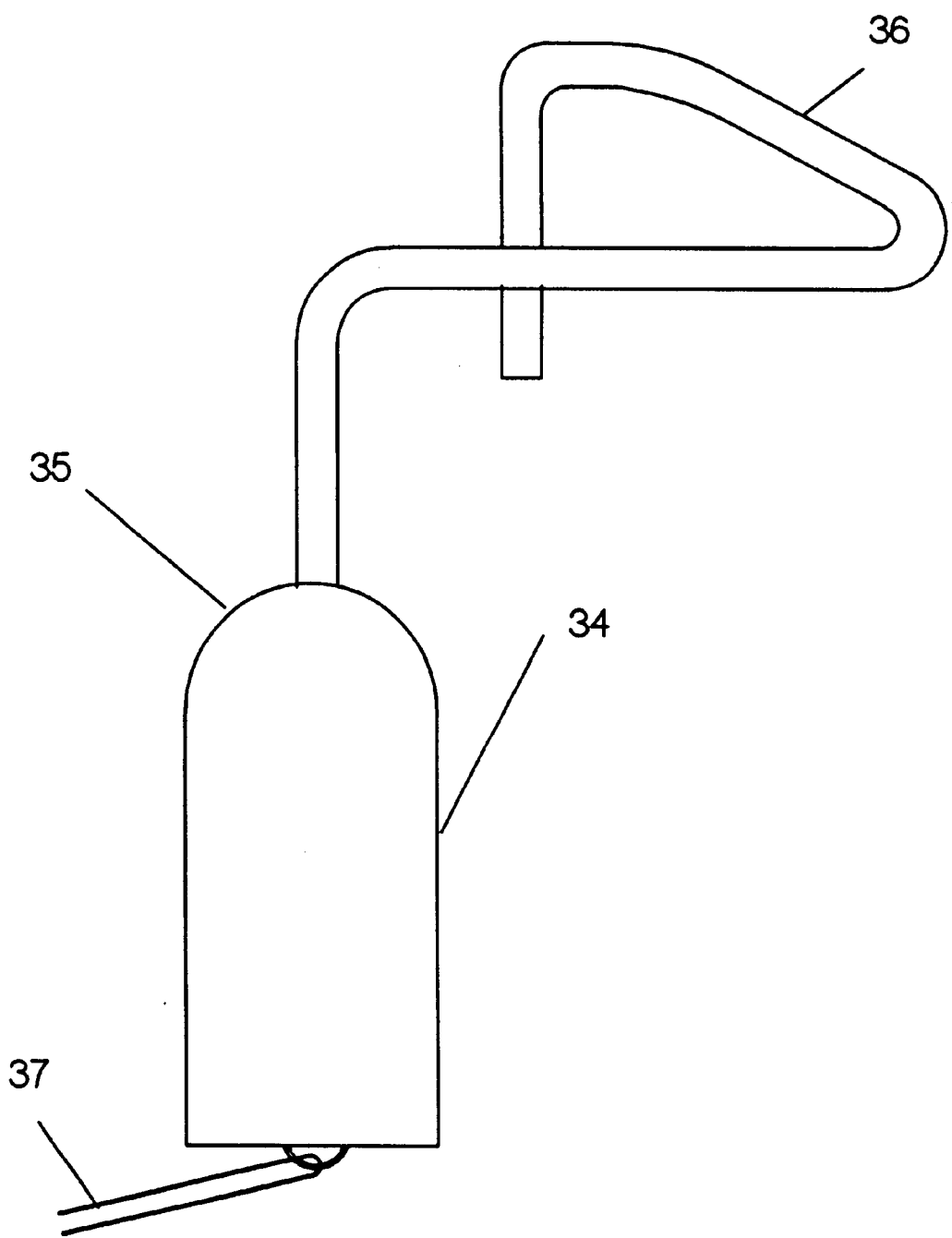
FIG. 4 is a side view of a weighted retriever device which is not connected to a pole.

FIG. 4 shows an embodiment wherein a heavy weight 34 is connected at its top end 35 with a rigid loop 36, similar to those discussed above, but is not connected to a pole. This device is adapted for enclosing a snagged line within the loop and allowing the weight to guide itself downward to make contact with the snagged lure and thereby break it loose. A line 37 may be attached to the weight to enable retrieval of the weight without becoming entangled or interfering with operation of the loop.

Figure 2:
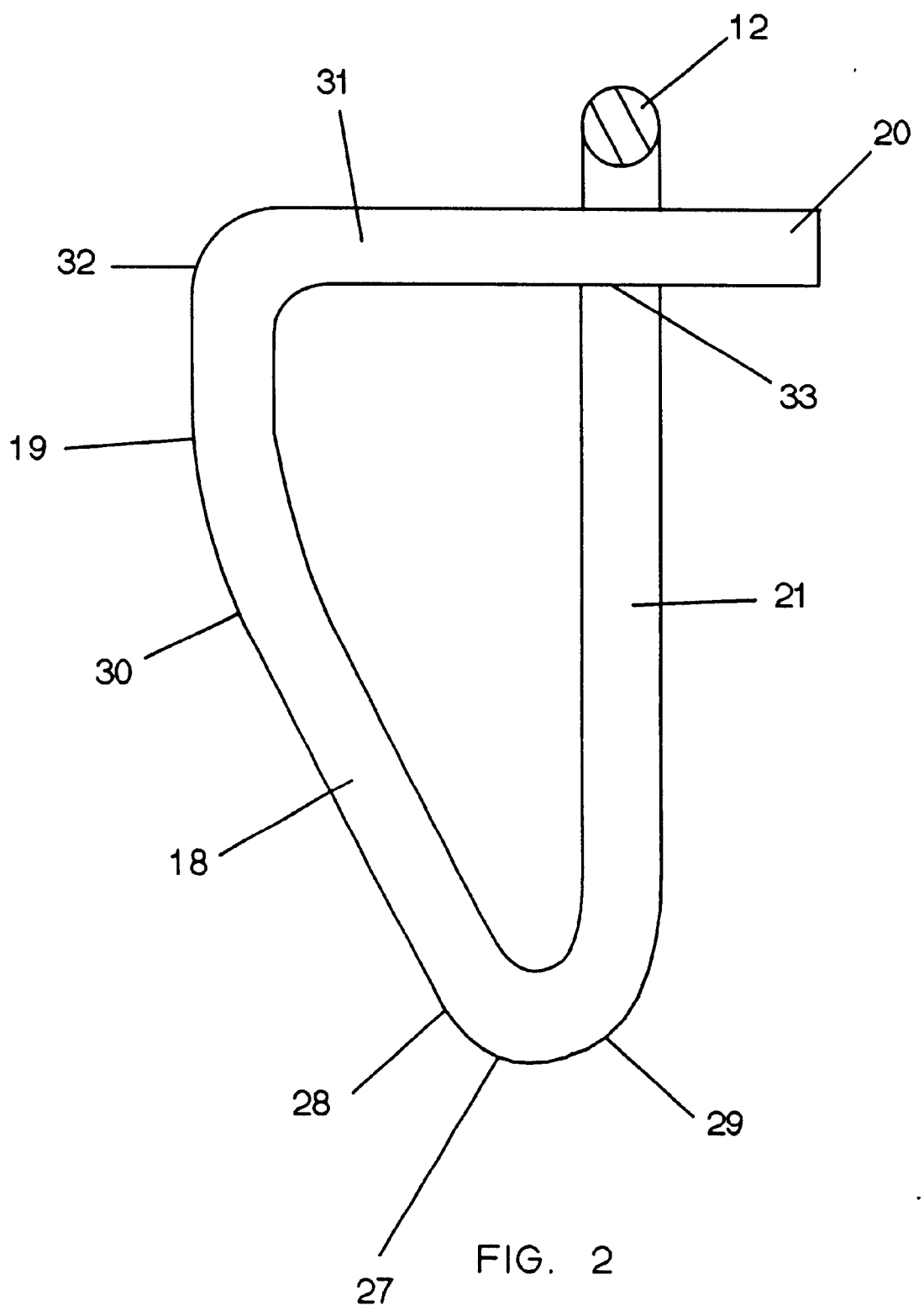
FIG. 2 is a top view of the retriever loop shown in FIG. 1.

In operation, the device as shown in FIG. 1 may be deployed to engage a snagged lure by the following procedure: With the line held tight, place the device in a position such that the corner between tip 20 and the end of loop portion 21 adjacent bend 25 comes into contact with the line. Rotate the device counterclockwise when seen from above until the fourth portion 31 of the loop becomes generally parallel to the line. Upon tilting the pole the line will slide through gap 33 and may then be moved within the loop as required. In the event that the loop is made in the form of of a mirror image of the version shown, that is, if portions 18, 19 and 31 were located to the right instead of to the left as shown in FIG. 2, and the tip was located to the left, the procedure would be modified to rotate the pole in a clockwise direction.

While the invention is described in terms of specific embodiments, it is not to be understood as limited to such embodiments, but is limited only in accordance with the attached claims.

What is claimed is:

1. A device for retrieving a snagged fishing lure comprising:

a hand held pole having an upper end and an lower end;

a rigid metal rod or wire having an upper portion mounted axially in the lower end of said pole;

said rod or wire at a lower portion thereof formed into a generally polygonal loop;

said loop comprising a plurality of sequential portions, each portion having a first end and a second end and said loop portions being disposed generally coplanar with respect to one another;

a first one of said loop portions having a said first end integral with said lower portion of said rod or wire and a said second end integral with a second loop portion, said first and second loop portions disposed to form an acute angle at a corner therebetween;

a third one of said loop portions disposed parallel to said first loop portion and having a said first end connected to said second end of said second loop portion;

a fourth one of said portions having said first end connected to said second end of said third loop portion and said second end comprising a tip extending past said first portion and spaced apart therefrom so as to provide a gap for passage of a fishing line into the loop; and said loop being disposed at an obtuse angle with respect to said pole.

2. The device as defined in claim 1 wherein each of said loop portions defines a straight line.

3. The device as defined in claim 2 wherein said pole comprises a plurality of extendable sections.

4. The device as defined in claim 1 wherein said rigid rod or wire has a diameter of ⅛ to ¼ inch across.

5. The device as defined in claim 4 wherein said obtuse angle is from 110 to 130 degrees.

6. The device as defined in claim 5 wherein said acute angle is from 55 to 70 degrees.

7. The device as defined in claim 5 wherein said gap is from ⅛ to ¼ inch across.

8. The device as defined in claim 4 wherein said first loop portion is 3 and ½ to 4 inches long, said second loop portion is 2 to 3 inches long, said third loop portion is from 1 to 1 and ½ inch long and the tip of said fourth portion extends from ½ to 1 inch past said first loop portion.

* * * * *